(12) United States Patent
Hutchinson et al.

(10) Patent No.: US 11,468,161 B2
(45) Date of Patent: Oct. 11, 2022

(54) METHOD AND DEVICE FOR PROVIDING A USER AUTHENTICATION CREDENTIAL

(71) Applicant: THALES DIS CPL USA, INC., Austin, TX (US)

(72) Inventors: Michael Hutchinson, Austin, TX (US); Asad Ali, Austin, TX (US)

(73) Assignee: THALES DIS CPL USA, INC., Austin, TX (US)

( * ) Notice: Subject to any disclaimer, the term of this patent is extended or adjusted under 35 U.S.C. 154(b) by 139 days.

(21) Appl. No.: 16/415,498

(22) Filed: May 17, 2019

(65) Prior Publication Data
US 2020/0364328 A1   Nov. 19, 2020

(51) Int. Cl.
| | | |
|---|---|---|
| G06F 21/00 | (2013.01) | |
| G06F 21/45 | (2013.01) | |
| G06F 21/31 | (2013.01) | |

(52) U.S. Cl.
CPC .............. *G06F 21/45* (2013.01); *G06F 21/31* (2013.01)

(58) Field of Classification Search
CPC .......... G06F 21/45; G06F 21/31; G06D 21/31
See application file for complete search history.

(56) References Cited

U.S. PATENT DOCUMENTS

| | | | | |
|---|---|---|---|---|
| 8,510,811 | B2* | 8/2013 | Kuang | ................ H04L 63/0869 726/5 |
| 2008/0115208 | A1* | 5/2008 | Lee | ........................ H04L 9/3231 726/19 |
| 2009/0187975 | A1* | 7/2009 | Edwards, Jr. | ........... G06F 21/31 726/4 |
| 2010/0199086 | A1* | 8/2010 | Kuang | ................ H04L 63/0869 713/155 |

(Continued)

FOREIGN PATENT DOCUMENTS

CN   106815517 A   6/2017

OTHER PUBLICATIONS

Notification of Transmittal of the International Search Report and the Written Opinion of the International Searching Authority (Forms PCT/ISA/220, PCT/ISA/210, and PCT/ISA/237) dated Oct. 2, 2020, in corresponding International Application No. PCT/US2020/031613. (14 pages).

*Primary Examiner* — Tongoc Tran
(74) *Attorney, Agent, or Firm* — Marc Boillot; THALES DIS CPL USA, Inc

(57) ABSTRACT

A method for providing a user authentication credential comprises a) registering, in a device, at least one reference character, as a first user authentication credential; b) submitting, by the user, to the device, at least one character, as a second user authentication credential; c) retrieving, by the device, each reference character along with a corresponding position within the first user authentication credential; d)

(Continued)

comparing, by the device, each submitted character within the second user authentication credential to a corresponding reference character within the first user authentication credential at one and the same position within the second user authentication credential and the first user authentication credential; and e) providing, by the device to the user, if the submitted character does not match the corresponding reference character, an information item for prompting the user to correct the submitted character.

10 Claims, 1 Drawing Sheet

(56) References Cited

U.S. PATENT DOCUMENTS

| | | | | |
|---|---|---|---|---|
| 2010/0306858 | A1* | 12/2010 | McLaren | G06Q 10/06 726/28 |
| 2012/0209735 | A1* | 8/2012 | Subramanian | H04L 9/321 705/26.1 |
| 2013/0061298 | A1* | 3/2013 | Longobardi | G06F 21/42 726/6 |
| 2013/0179944 | A1* | 7/2013 | Kozlay | H04L 9/3234 726/4 |
| 2014/0137216 | A1 | 5/2014 | Mohler | |
| 2015/0281216 | A1* | 10/2015 | Donohue | H04L 63/0838 713/171 |
| 2020/0033939 | A1* | 1/2020 | Liu | G06F 3/017 |

* cited by examiner

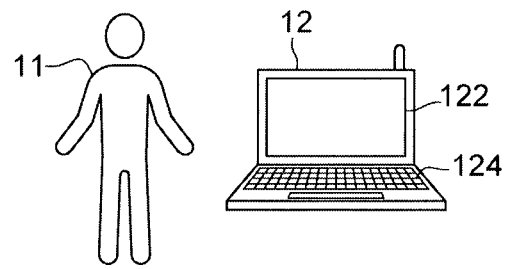
Fig. 1
Fig. 2
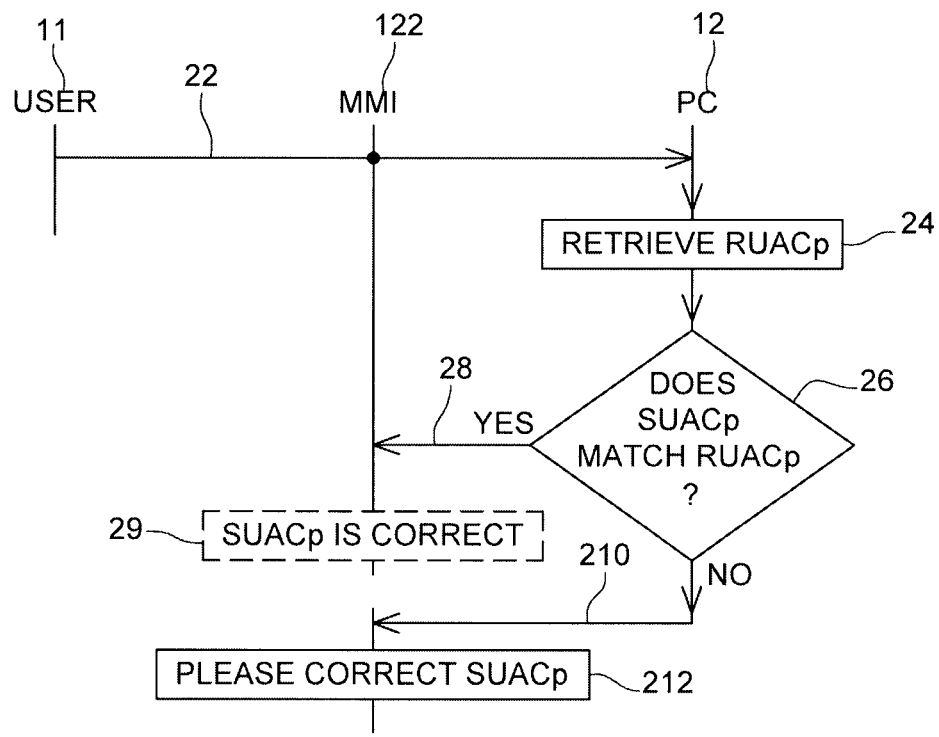
Fig. 3
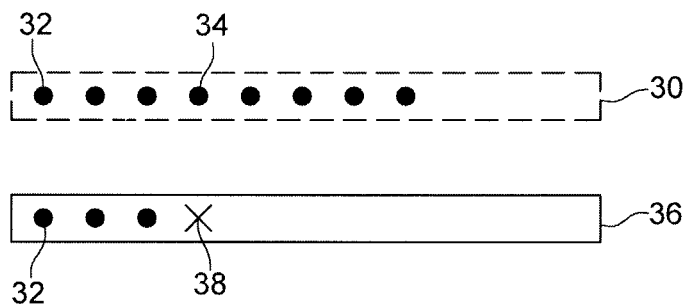

METHOD AND DEVICE FOR PROVIDING A USER AUTHENTICATION CREDENTIAL

FIELD OF THE INVENTION

The invention relates generally to a method for providing a user authentication credential.

Furthermore, the invention also pertains to a device for providing a user authentication credential.

The present invention is notably applicable to a computer device field in which the device includes a user terminal, like e.g., a Personal Computer (or PC) or a (mobile) (tele)phone.

STATE OF THE ART

As known per se, when a user has to set or change his/her password used to authenticate to a computing device, the user is informed, before or after completing a verification password entry, that he/she has failed in entering a matching password.

However, such implementations are not satisfying since the user is aware either too early or too late that a password entry has failed.

The user has therefore to re-attempt to enter the password(s).

Thus, there is a need of a solution that allows enhancing, in an efficient manner, the user experience when entering a password to set or change the password.

SUMMARY OF THE INVENTION

The invention proposes a solution for satisfying the just herein above specified need by providing a method for providing a user authentication credential.

According to the invention, the method comprises:

a) registering, in a device, at least one reference character, as a first user authentication credential;

b) submitting, by the user, to the device, at least one character, as a second user authentication credential;

c) retrieving, by the device, each of the at least one reference character comprised within the first user authentication credential along with a corresponding position within the first user authentication credential;

d) comparing, by the device, each of the just submitted character within the second user authentication credential to a corresponding reference character within the first user authentication credential at one and the same position within the second user authentication credential and the first user authentication credential; and e) providing, by the device to the user, just after the character submission, only if the just submitted character does not match the corresponding reference character, at least one information item for prompting the user to correct the just submitted character.

The principle of the invention consists in that a device records a first user authentication credential comprising a sequence of reference characters and, when a user enters a sequence of characters, as a second user authentication credential, the device gets each reference character with its place in the first user authentication credential. Then, the device compares each just entered character to the reference character having the same place within their respective user authentication credentials. And, in case of a character difference or mismatch for a given place, the device informs the user, just after the concerned character entry, about the incorrectness of the just entered character.

The entered second user authentication credential may consist of a confirmation character sequence through which the user attempts to re-enter or confirm the first user credential.

The user is thus immediately informed when he/she enters an incorrect or wrong character within the second user authentication credential. The user therefore knows at each character entry that the entered character is incorrect or wrong, when applicable.

As the user is informed about each wrong entered character, the user is able to correct individually each concerned wrong entered character with its place without having to re-enter all of the other characters that form the possibly already entered characters which are correct (unless they are also indicated as being wrong).

The user can detect easily and correct individually each and every wrong entered character with its place within the second user authentication credential, so as to submit correctly a whole user authentication credential.

The user is therefore more quickly informed than with the aforementioned prior art solution that his/her entered user authentication credential includes a just entered character that is wrong.

The user can locate more easily than with the aforementioned prior art solution each and every wrong character within all or part of the user authentication credential that the user has already entered.

The user is therefore able to correct each incorrect or wrong (submitted) character within the (submitted) user authentication credential by knowing which character is to be corrected and its place or position within the (submitted) user authentication credential.

The invention solution is simple and efficient since the user is informed for each wrong entered character within the submitted user authentication credential as soon as it is entered by the user.

The invention solution therefore allows enhancing the user experience with respect to the known solution.

According to an additional aspect, the invention is a device for providing a user authentication credential.

According to the invention, the device is configured to:

register at least one reference character, as a first user authentication credential;

receive, from the user, at least one character, as a second user authentication credential;

retrieve each of the at least one reference character comprised within the first user authentication credential along with a corresponding position within the first user authentication credential;

compare each of the just submitted character within the second user authentication credential to a corresponding reference character within the first user authentication credential at one and the same position within the second user authentication credential and the first user authentication credential; and provide the user, just after the character submission, only if the just submitted character does not match the corresponding reference character, with at least one information item for prompting the user to correct the just submitted character.

The device may include a user terminal, like e.g., a PC, a (mobile) phone, a tablet or a chip, an SE, a server and/or any kind of communicating and computing device.

BRIEF DESCRIPTION OF THE DRAWINGS

Additional features and advantages of the invention will be apparent from a detailed description of one preferred embodiment of the invention, given as an indicative and non-limitative example, in conjunction with the following drawings:

FIG. 1 illustrates a simplified diagram of an embodiment of a PC and its user, the PC being adapted to prompt the user, when submitting a password, for each wrong submitted character, during a character submission, to correct the concerned wrong character(s) with respect to the corresponding reference character of a reference password, according to the invention;

FIG. 2 is an embodiment of a message flow between the PC and the user of FIG. 1, so that, just after each character submission, the PC detects, for each submitted character, a character mismatch with respect to a corresponding reference character and prompts the user to correct the just submitted character that has been detected as being incorrect, according to the invention; and FIG. 3 represents an exemplified message of FIG. 2 that may be used for prompting the user to correct, during a character submission for setting or changing a reference password, the just submitted character with its position, according to the invention.

DETAILED DESCRIPTION

Herein under is considered a case in which the invention method for providing a User Authentication Credential (or UAC) is implemented by a PC, as a standalone device. The device does not need to cooperate with another device, like e.g., an SE, so as to carry out the function(s) that is(are) described infra.

According to another embodiment (not represented), the invention method for providing a UAC is implemented by a Terminal Equipment (or TE) that comprises a (user) terminal and a Secure Element (or SE) that is that is connected or coupled to the terminal. According to such an embodiment, the SE is adapted to carry out the functions that are performed by the terminal and that are described infra by adding a secure data storage and a secure data processing in the SE. The SE may include an incorporated chip, like e.g., an embedded Universal Integrated Circuit Card (or eUICC) or an integrated Universal Integrated Circuit Card (or iUICC), within the terminal, as an SE host device, or a chip that is communicatively coupled to the terminal, as an SE host device, and included in a smart card (or another medium). The chip may be fixed to or removable from its host device. As removable SE, it may be a Subscriber Identity Module (or SIM) type card, a Secure Removable Module (or SRM), a smart dongle of the USB (acronym for "Universal Serial Bus") type, a (micro-) Secure Digital (or SD) type card or a Multi-Media type Card (or MMC) or any format card to be coupled to a host device. The invention does not impose any constraint as to a kind of the SE type.

Within the present description, an SE is a smart object that includes a chip(s) that protect(s), as a tamper resistant component(s), access to stored data and that is intended to communicate data with an external device(s), like e.g., an SE host device, such as a mobile (tele)phone, a server(s) and/or its user.

Naturally, the herein below described embodiment is only for exemplifying purposes and is not considered to reduce the scope of the invention.

FIG. 1 shows schematically a user 11 and a PC 12, as a (computing) device.

The PC 12 may include or be connected or communicatively coupled to one or several chips (not represented).

The chip(s) may be incorporated, possibly in a removable manner, within a Printed Circuit Board (or PCB) of the PC 12, as a chip host device.

The chip(s) may also incorporate at least part of the PC component(s), like e.g., an application processor(s) and/or other electronic component(s).

Alternately, the chip(s) may be included in or removable from one or several SEs.

The (or each) SE includes one or several chip(s) comprising each a (micro)processor(s) (and/or a (micro)controller(s)), as data processing means, a memory(ies), as data storing means, and one or several Input/Output (or I/O) interfaces that are internally all connected, through an internal bidirectional data bus, to each other.

Each (SE) chip I/O interface allows communicating data from the internal SE chip(s) to the chip exterior and conversely.

The (chip) medium may include, instead of the PC 12, a watch, a headset or the like, as an accessory of the PC 12 that is able to cooperate with the PC 12. The (chip) medium may include any other wearable device, like e.g., a camera, a clothing, a jewel (or jewelry) of the (PC) user 11 or anything that may accommodate or integrate the SE chip(s), which the user 11 wears or accesses.

Instead of a PC, the device may include a phone, a tablet, a desktop computer, a laptop computer, a media-player, a game console, a tablet, a netbook, a smart watch, a smart jewel (or jewelry), a handset, a Personal Digital Assistance (or PDA), another user terminal, a server and/or a SE. Such a device set is not exhaustive but only for exemplifying purposes.

The device may be any other device including means for processing data, comprising or being connected to communication means for exchanging data with outside, and comprising or being connected to means for storing data.

The PC 12 may be connected, through a wired or wireless link, to a server (not represented), as another (computing) device.

The PC 12 includes one or several (micro)processors (and/or a (micro)controller(s)) (not represented), as data processing means, comprising and/or being connected to one or several memories, as data storing means, comprising or being connected to means for interfacing with the concerned user 11, such as a Man Machine Interface (or MMI), and comprising or being connected to an I/O interface(s) that are internally all connected, through an internal bidirectional data bus.

The PC memory(ies) may include one or several volatile memories and/or one or several non-volatile memories.

During a registration phase, the user 11 (or the PC 12 or another entity (not represented), like e.g., a server) has generated or created a Reference (or R) password, as a Reference User Authentication Credential (or RUAC).

A PC memory(ies) store(s) the created RUAC. The PC memory(ies) store(s), preferably in an encrypted manner, the RUAC, so as to protect access to the thus stored RUAC. The PC 12 uses a decryption key to decrypt the encrypted RUAC, so as to get the RUAC (in plaintext). Only the PC 12 that possesses the decryption key is able to access the corresponding encrypted RUAC.

Alternately, a chip (not represented) that is connected or communicatively coupled to the PC 12 stores, preferably in a secure manner, the RUAC.

Instead of a password, the RUAC may constitute one or several elements comprised in the group comprising a user name, an access code, a Personal Identification Number (or PIN), a passkey and a passphrase.

The RUAC comprises a string, combination or sequence of reference characters.

The reference characters may include one or several letters, one or several digits (i.e. numbers), one or several symbols and/or one or several special characters. The letter(s) may include one or several upper cases and/or one or several lower cases.

The RUAC has a length denoted by N. For example, the RUAC may have a length of two or more characters. The longer the RUAC is the better it is in terms of security since the entropy increases with the increase of the UAC length. In other words, the longer the RUAC is the more complex it is for an attacker to guess or crack the RUAC.

The (exact) RUAC has to be typed, entered or submitted by the user 11, so that the PC 12 authenticates successfully the user 11. Once the user 11 is authenticated to the PC 12, the PC 12 authorizes the user 11 to access one or several resources, such as one or several data items and/or one or several services accessible by or through the PC 12.

The PC MMI may include a display screen(s) 122, a keyboard(s) 124, and/or a loudspeaker(s) (not represented).

Alternately, instead of separate display screen and keyboard, the PC MMI includes a physical or virtual display screen that incorporates a virtual keyboard.

The PC MMI (or an MMI connected or coupled to the PC 12) allows the user 11 to interact with the PC 12 (or another entity connected or coupled to the PC 12, such as a server) and vice versa.

The PC 12 (or a cooperating server) memory(ies) store(s) an Operating System (or OS) and preferably an invention application for providing a UAC.

Alternately, instead of the PC 12, a chip or an SE cooperating with the PC 12 stores the invention application for providing a UAC.

A PC 12 (or a cooperating server) processor executes the invention application for providing an UAC.

The PC 12 (or a cooperating server) is arranged to register, in the PC 12 (or in a device connected or coupled to the PC 12, such as a cooperating server), a sequence of reference characters, as a RUAC. Each reference character comprised in the RUAC is identified with its position within the RUAC, like e.g., the RUACp for the position denoted by p within the RUAC. The RUACp begins with the reference character at the first position 1, as a first reference character, i.e. the reference character of the first position denoted by RUAC1, and ends with the reference character at the last position, i.e. the length N of the RUAC, as a last reference character, i.e. the reference character of the last position denoted by RUACN.

The PC 12 (or a cooperating entity) is able to receive, from the user 11, a sequence of characters, as a Submitted UAC (or SUAC).

The PC 12 (or a cooperating entity) is arranged to retrieve each of the reference characters, namely all of the reference characters from the RUAC1 to the RUACN, included in the RUAC with a corresponding position p within the RUAC, as RUACp. The position p varies from 1 to N for the RUAC, N being the RUAC length.

According to an essential feature of the invention, the PC 12 (or a cooperating entity) is adapted to compare each of the just submitted character SUACp to a corresponding reference character RUACp within the RUAC at one and the same position p within the SUAC and the RUAC.

The PC 12 (or a cooperating entity) is configured to provide the user 11, just after the character submission, only if the just submitted character does not match the corresponding reference character (within the RUAC), one or several information items for prompting the user 11 to correct the just submitted character.

The PC 12 (or a cooperating entity) provides, through the PC MMI or another MMI connected or coupled to the PC 12 (or a cooperating entity), the information item(s) for prompting the user 11 to correct the just submitted character, such as "the entered character(s) do(es) not match the corresponding password reference character(s)", as a mismatch message, or the like.

FIG. 2 depicts an exemplary embodiment of a message flow 20 that involves the user 11 and the (user) PC 12.

In the described example, it is assumed that the PC 12 stores the user 11 RUAC.

It is further assumed that the user 11 desires to access a resource(s) accessible by or through the PC 12.

It is still further assumed that the PC 12 prompts the user 11 to provide a UAC, so as to authenticate the user 11.

The user 11 provides 22, through the MMI 122 and 124 related to the PC 12 (or an MMI connected or coupled to the PC 12), the PC 12 a first SUAC, as SUAC1.

Once the PC 12 (and more exactly the invention application) has received the SUAC1, the PC 12 (and more exactly the invention application) retrieves 24 a first RUAC, as a corresponding reference character comprised in the RUAC, as RUAC1, when applicable (if the RUAC comprises a corresponding reference character with the one and the same position than the character SUACp that has just been submitted).

Then, the PC 12 (and more exactly the invention application) detects 26 whether the SUAC1, as the first submitted character, does or does not match the RUAC1, as the first reference character.

If the SUAC1 matches the RUAC1, then the PC 12 (and more exactly the invention application) may send 28, just after the SUAC1 submission, one or several information items for indicating, through the MMI 122 related to the PC 12 (or an MMI connected or coupled to the PC 12), that the just submitted SUAC1 is correct, such as a pop-up message 29 "the SUAC1 is correct" or "match".

Otherwise, i.e. if the SUAC1 does not match the RUAC1, the PC 12 provides 210 the user 11, just after the SUAC1 submission, with one or several information items for prompting, through the MMI 122 related to the PC 12 (or an MMI connected or coupled to the PC 12), the user 11 to correct the just submitted SUAC1. For instance, the PC 12 displays or presents a message that means that the just submitted SUAC1 is not correct (or ko), such as "Please correct SUAC1." 212. Instead of a visible information item(s) for informing that the just submitted character is not correct, the information item(s) may be provided through a sound(s), a music(s) or an audible signal(s) and/or a mechanical vibration(s) that may be only heard and/or physically felt respectively by the concerned user 11, so as to inform only the user 11 (and not any person who can see, over a user 11 shoulder, a display screen that displays a visible information item(s)). Such audible information item(s) and/or physically felt information item(s) allow(s) enhancing the security with respect to the visible information item(s), so as to inform the user 11 that the just submitted character is not correct.

Once the SUAC1 has been processed by the PC 12 and possibly corrected by the user 11, when applicable, the user 11 provides 22, through the MMI 122 and 124 related to the PC 12 (or an MMI connected or coupled to the PC 12), the PC 12 with a second SUAC, as SUAC2.

Then, the PC 12 repeats, as many times as the user 11 submits an additional character, the previous described steps, namely a PC reception 22 of the SUACp, a PC retrieval 24 of a corresponding RUACp, when applicable, a PC detection 26 of a match between the received SUACp and the retrieved RUACp, when applicable, and a possible user provision 210, just after the SUACp submission, of the user 11 with one or several information items for prompting the user 11 to correct the just submitted character, when applicable.

The PC 12 provides, just after each character submission SUACp, i.e. only if the just submitted character SUACp does not match a corresponding reference character RUACp when the corresponding reference character RUACp is present within the RUAC, a message for prompting the user 11 to correct the just submitted character. Such a message allows the user 11 to replace the just submitted character SUACp by another character as long as the position p is equal or less than the RUAC length N.

If the user 11 provides one or more characters beyond the RUAC length, then the PC 12 provides, just after each such character submission, i.e. only if the just submitted character SUACp does not match a corresponding reference character when no corresponding reference character is present within the RUAC, a message for prompting the user 11 to correct the just submitted character. Such a message for allows the user 11 to delete the just submitted character SUACp since the position p is greater than the RUAC length N.

FIG. 3 illustrates an exemplary embodiment of two boxes that may be displayed by the PC 12 (or another device connected or coupled to the PC 12) to the user 11 when he/she sets or changes a reference password, as RUAC.

The PC 12 may display a reference text box 30, as a first text box, in which the user 11 has entered a RUAC. The reference text box 30 comprises the reference password that includes eight reference characters (i.e. N=8). As soon as each reference character has been entered, the PC 12 displays or writes, for each entered reference character, e.g., a dot 32, as a match hiding character, so as to indicate that there is a reference character that is present in a corresponding position within the RUAC.

The match hiding character(s) is(are) a character(s) that is(are) preferably distinct from any of the reference characters comprised within the RUAC. The match hiding character(s) allow(s) not exposing the concerned reference character, so as not to reveal the concerned reference character and remain thus secure.

Instead of a dot, the match hiding character(s) may include a star, a triangle, a square, a special character or any other pattern that is clearly distinct from any character that may be used as a reference character. Such a match hiding character set is not exhaustive but only for exemplifying purposes.

The match hiding character(s) may be displayed in a first colour, such as green.

The reference text box 30 shows the complete length of the RUAC, e.g. a size of eight reference characters (N=8).

The PC 12 displays a submission text box 36, as a second text box when the reference text box 30 is present. The submission text box 36 comprises the submitted password, as SUAC, that has to match the RUAC.

Four submitted characters have been typed, entered or submitted so far by the user 11 for his/her reference password.

For each of the first three submitted characters, namely the SUAC1, the SUAC2 and the SUAC3, the submitted character matches the corresponding reference character, namely the RUAC1 32, the RUAC2 and the RUAC3 respectively, then the PC 12 displays or writes, just after the character comparison, e.g., the dot 32, as the match hiding character, so as to provide the user 11 with a positive character match, as a feedback.

Then, after the user 11 has submitted a fourth character, namely the SUAC4 38, where the submitted fourth character does not match the corresponding reference character, namely the RUAC4 34, then the PC 12 displays or writes, just after the character comparison, e.g., a cross 38, as a mismatch hiding character(s), so as to provide the user 11 with a negative character match or a character mismatch, as a feedback.

Alternately (or additionally) to the writing of the cross 38 in the submission text box 36, the PC 12 displays or writes, simultaneously, just after the character comparison, instead of the dot 34 for the RUAC4 34 in the reference text box 30, e.g., a cross or another different character (not represented), as a mismatch hiding character(s), so as to provide the user 11 with an (enhanced) negative character match or an (enhanced) character mismatch, as a feedback. Such an (enhanced) character mismatch allows the user 11 to locate (more) easily the position of the concerned incorrect character within the SUAC.

The mismatch hiding character(s) is(are) preferably distinct from any of the reference characters comprised within the RUAC.

The mismatch hiding character(s) is(are) used for prompting the user 11 to correct the just submitted fourth character SUAC4 38.

The mismatch hiding character(s) allow(s) not exposing the concerned reference character, so as not to reveal the concerned reference character and remain thus secure.

Instead of a cross, the mismatch hiding character may include a dot, a star, a triangle, a square, a special character or any other pattern that is clearly distinct from any character that may be used as a reference character and a (positive) character match. Such a mismatch hiding character set is not exhaustive but only for exemplifying purposes.

The mismatch hiding character may be identical to or distinct from the match hiding character.

When the first hiding character and the second hiding character constitute one and the same character, the first hiding character and the second hiding character have a feature that is specific to each of them and that allows distinguishing one from the other.

The mismatch hiding character may be displayed in e.g., a second colour, such as red, while the match hiding character is displayed in the first colour, such as green. The second colour is distinct from the first colour.

The mismatch hiding character may be displayed in e.g., a second font, such as Tahoma, while the match hiding character is displayed in a first font, such as Arial. The second font is distinct from the first font.

The mismatch hiding character may be displayed in e.g., a second size, such as 20, while the match hiding character is displayed in a first size, such as 10. The second size is distinct from the first size.

The mismatch hiding character may be displayed with e.g., a second animation, such as a man/woman who cries, while the match hiding character is displayed with a first animation, such as a man/woman who smiles. The second animation is distinct from the first animation.

The mismatch hiding character may be displayed with e.g., a second appearance, such as a hiding character that flashes, while the match hiding character is displayed with a first appearance, such as the hiding character that remains displayed without flashing. The second appearance is distinct from the first appearance.

Such a provision to the user 11 of information item(s) that prompt(s) him/her to correct the just submitted SUAC4 allows making him/her aware about a corresponding character mismatch or incorrectness at the earliest possible moment.

Thus, a user who types, enters or submits a long complex password, i.e. comprising four or more than four reference characters, without focusing on the display screen 122, sees immediately the character position(s) that has(have) error(s) in the concerned character(s). The user can thus correct only the incorrect or erroneous character(s) without having to re-enter at least once the SUAC and possibly at least once the RUAC. The user saves therefore time to provide a correct SUAC with respect to the time needed to re-enter at least once the whole SUAC. The PC 12 is thus less likely to consume power so that the user 11 provides a correct SUAC with respect to a known solution that is based on a correction of the whole SUAC. Such a power consumption saving may be thus used otherwise, i.e. without consuming power of the PC 12 so as to interact with the user 11 to correct the whole SUAC.

Alternatively, instead of providing visual information item(s) that prompt(s) him/her to correct the just submitted character, the information item(s) is(are) sent, through a human audible channel and/or a physical sensitive channel, that allow(s) making him/her aware about a corresponding character mismatch or incorrectness while being more secure.

The invention solution is simple.

The invention solution allows enhancing the user experience when entering/providing a user authentication credential preferably without exposing any information about any reference character comprised in the reference user authentication credential.

The invention solution allows enhancing for the user an identification of a location(s) or position(s) of a concerned incorrect submitted character(s) and therefore its (their) correction.

The invention solution allows enhancing the efficiency of the interaction between the device and the user to provide a user authentication credential.

The invention claimed is:

1. A method for providing a user authentication credential, the method comprising:
   a) registering, in a device, at least one reference character, as a first user authentication credential;
   b) submitting, by the user, to the device, at least one character, as a second user authentication credential;
   c) retrieving, by the device, each of the at least one reference character comprised within the first user authentication credential along with a corresponding position within the first user authentication credential;
   d) comparing, by the device, each of the just submitted character within the second user authentication credential to a corresponding reference character within the first user authentication credential at one and the same position within the second user authentication credential and the first user authentication credential;
   e) providing, by the device to the user, just after the character submission, only if the just submitted character does not match the corresponding reference character, at least one information item for prompting the user to correct the just submitted character; and
   f) repeating steps b to e such that the user sees character positions that have errors in concerned characters, so that the user is able to correct individually each and every concerned wrong entered character, after said submitting is completed, with its place within all of said second user authentication credential without having to re-enter all of the other characters.

2. Method according to claim 1, wherein the step e) consists in providing, by the device to the user, just after the character submission, only if the just submitted character does not match the corresponding reference character when no corresponding reference character is present within the first user authentication credential, a first message for prompting the user to correct the just submitted character, the first message allowing the user to delete the just submitted character.

3. Method according to claim 1, wherein the step e) consists in providing, by the device to the user, just after the character submission, only if the just submitted character does not match the corresponding reference character when the corresponding reference character is present within the first user authentication credential, a second message for prompting the user to correct the just submitted character, the second message allowing the user to replace the just submitted character by another character.

4. Method according to claim 1, wherein the device displays or lets another cooperating device display, just after the character comparison, only if the just submitted character matches the corresponding reference character, at least one match hiding character, the at least one match hiding character being distinct from each of the reference character comprised within the first user authentication credential.

5. Method according to claim 4, wherein the step e) consists in providing, by the device to the user, just after the character comparison, only if the just submitted character does not match the corresponding first reference user authentication credential character, at least one mismatch hiding character, the at least one mismatch hiding character being distinct from the at least one match hiding character, the at least one mismatch hiding character being distinct from each of the reference character comprised within the first user authentication credential, the at least one mismatch hiding character being used for prompting the user to correct the just submitted character
   wherein when said submitting of second user authentication credential is complete, for any not corrected wrong entry, mismatch hiding characters are displayed,
   thereby enhancing identification of locations or positions of concerned incorrect submitted characters.

6. Method according to claim 5, wherein the at least one mismatch hiding character is constituted by at least one element comprised within a group including:
   a dot;
   a cross;
   a star;
   a triangle;
   a square;
   a special character;
   the mismatch hiding character being displayed in a second colour, the match hiding character being displayed in a first colour, the second colour being distinct from the first colour;
   the mismatch hiding character being displayed in a second font, the match hiding character being displayed in a first font, the second font being distinct from the first font;
   the mismatch hiding character being displayed in a second size, the match hiding character being displayed in a first size, the second size being distinct from the first size;

the mismatch hiding character being displayed with a second animation, the match hiding character being displayed with a first animation, the second animation being distinct from the first animation;

the mismatch hiding character being displayed with a second appearance, the match hiding character being displayed with a first appearance, the second appearance being distinct from the first appearance.

7. Method according to claim 1, wherein the device provides, through a Man Machine Interface relating to the device or another cooperating device, the at least one information item for prompting the user to correct the just submitted character.

8. Method according to claim 1, wherein the method is implemented for setting or changing the first user authentication credential.

9. A device for providing a user authentication credential, wherein the device is configured to:
- a) register at least one reference character, as a first user authentication credential;
- b) receive, from the user, at least one character, as a second user authentication credential;
- c) retrieve each of the at least one reference character comprised within the first user authentication credential along with a corresponding position within the first user authentication credential;
- d) compare each of the just submitted character within the second user authentication credential to a corresponding reference character within the first user authentication credential at one and the same position within the second user authentication credential and the first user authentication credential; and
- e) provide the user, just after the character submission, only if the just submitted character does not match the corresponding reference character, with at least one information item for prompting the user to correct the just submitted character; and
- f) repeating steps b to e such that the user sees character positions that have errors in concerned characters, so that the user is able to correct individually each and every concerned wrong entered character, after said submitting is completed, with its place within all of said second user authentication credential without having to re-enter all of the other characters wherein when said receive of second user authentication credential is complete, for any not corrected wrong entry, mismatch hiding characters are displayed, thereby enhancing identification of locations or positions of concerned incorrect submitted characters.

10. Device according to claim 9, wherein the device is comprised within a group including:

a Personal Computer;
a Personal Digital Assistant;
a telephone;
a mobile phone;
a user terminal;
a Secure Element;
a server.

* * * * *